Jan. 13, 1959 E. M. JONES 2,868,593

ROTARY AIR BEARING

Filed Dec. 14, 1954

Inventor
Edward M. Jones
by Alois W. Graf
Attorney

United States Patent Office 2,868,593
Patented Jan. 13, 1959

2,868,593

ROTARY AIR BEARING

Edward M. Jones, Cincinnati, Ohio, assignor to The Baldwin Piano Company, Cincinnati, Ohio, a corporation of Ohio Application December 14, 1954, Serial No. 475,165

5 Claims. (Cl. 308—9)

This invention relates to bearings, and more particularly to bearings generally known as "air bearings," in which the lubricating film between the bearing surfaces is a gas such as compressed air.

It is an object of this invention to provide a new and improved air bearing.

Another object of this invention is to provide an improved air bearing in which a flat parallel surface air bearing is combined with a spherical air bearing surface which, in addition to providing a portion of the bearing lifting force, acts to position the flat parallel surfaces transversely to the direction of their main lifting action.

Another object is to provide a bearing for a turntable or the like, the top surface of which rotates accurately both in a plane and about a single axis.

Figure 1:
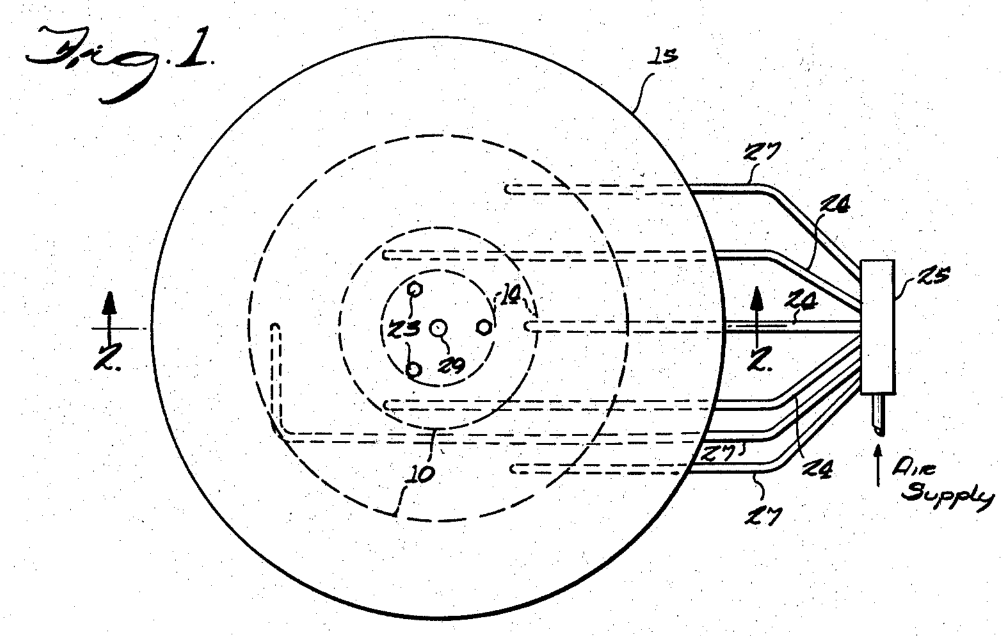
Figure 2:
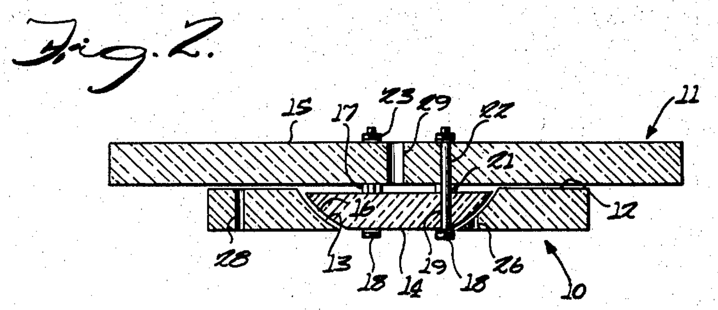

Other objects and advantages of the invention will be apparent during the course of the following description when read in connection with the accompanying drawing, wherein:

Figure 1 is a top view of an air bearing constructed in accordance with this invention; and Figure 2 is a cross-sectional view taken on line 2—2 of Figure 1.

Referring now to the drawing, there is shown an air bearing consisting of a stator 10 and a rotor 11. The stator 10 has an optically flat surface 12 adjacent a recessed spherical concave surface of revolution 13 with its axis normal to the flat surface. The rotor consists of a plano-convex lens-shaped member 14 and a turntable or disc 15 which is optically flat at least on the under side. The top side is preferably optically flat and as parallel as possible to the under side. The plano-convex lens has a spherical surface 16 which matches the curvature of the spherical concave surface 13. The plane parallel disc 15 is adjustably positioned relative to the plano-convex lens 14 by three shims 17. The disc 15 and the lens 14 are connected together by means of three bolts 18 which pass respectively through holes 19 in the lens 14, holes 21 in the shims 17, and holes 22 in the disc 15. Each bolt 23 passes through one of the shims 17. Mating nuts 23 are screwed onto the ends of the bolts 18 to compress the sandwich-like structure consisting of the disc 15, the shims 17 and the lens 14. A plurality of capillary tubes 24 supply air from a manifold 25 to passages 26 in the stator 10 which feed the air to the spherical concave surface 13, thereby lubricating this surface. A second lubricating means is disposed between the flat surface 12 and the disc 15. For this purpose second plurality of capillary tubes 27 feed air from the manifold 25 to passages 28 which supply air to the optically flat surface 12 of the stator 10. An air supply (not shown) provides air under pressure to the manifold 25 which distributes this air to the capillary tubes 24 and 27. A passage 29 through the disc 15 (or if preferred, through the lens 14) provides an escape for the air which may be forced into the space between the disc 15 and the lens 14 from the air passages 26 and 28. The stator 10, plano-convex lens 14 and disc 15 are, in the preferred embodiment, made of glass since this permits a ready determination of the distance between the disc 15 and the surface 12 of the stator 10 by counting the number of interfering light fringes as viewed through the glass disc 15.

In the typical embodiment shown, the shims 17 between the disc 15 and the lens 14 are adjusted so that when the disc 15 contacts the surface 12 of the stator, there is a small spacing of .0001 to .0002 of an inch between the spherical surfaces 13 and 16.

In operation the pressure of the air supplied to passages 26 and 28 is raised until the rotor is lifted clear of the stator. As the air pressure is further raised, the spacing between the spherical surfaces 13 and 16 changes at a lower rate than the spacing between the disc 15 and the flat surface 12 of the stator. This different rate of change is due to the structural shape and arrangement of the air bearing components, and, for the typical embodiment, is about .7 times as fast as the change of spacing between the disc 15 and the surface 12. The spherical portion of the air bearing maintains the rotor and stator at all times in the same relative transverse position, whereas the flat portion keeps the disc 15 level or in the same plane at all times. Thus, no mechanical means are necessary to maintain the bearing surfaces above each other, but the bearing itself will automatically maintain the relative transverse and vertical positions of the stator and the rotor. The optimum air pressure applied to the passages 26 and 28 is that minimum pressure which maintains the rotor and stator surfaces clear of each other for all conditions of loading and impurities between the bearing surfaces.

While there has been shown and described an invention in connection with certain specific embodiments, it will, of course, be understood that it is not wished or intended to be limited thereto since it is apparent that the principles herein disclosed are susceptible of numerous other applications, and modifications may be made in the structural arrangement and in the instrumentalities employed without departing from the spirit and scope of this invention as set forth in the appended claims.

I claim as my invention:

1. An air bearing comprising a stator having an optically flat surface adjacent a spherical concave surface, a plano-convex lens disposed adjacent to the concave surface, and having a spherical surface which matches said spherical concave surface, an optically flat plane parallel disc positioned above said flat stator surface, said lens being connected to said disc, said lens and said disc serving as the rotor of said bearing, a first plurality of capillary tubes supplying air to said spherical concave surface, a second plurality of capillary tubes supplying air to said flat disc surface, said air acting to separate said stator and said rotor, and a passage through one of the rotor members to provide an escape for the air in the space between said disc and said lens.

2. An air bearing comprising a stator having an optically flat surface adjacent a spherical concave surface, a plano-convex lens disposed adjacent to the concave surface, and having a spherical surface which matches said spherical concave surface, a plane parallel disc positioned above said flat stator surface, said lens being connected to said disc so that a clearance exists between said lens and said concave surface when said disc contacts said optically flat surface, said lens and said disc serving as the rotor of said bearing, a first plurality of capillary tubes supplying air to said spherical concave surface, and a second plurality of capillary tubes supplying air to said flat disc surface, said air acting to separate said stator and said rotor.

3. An air bearing comprising a stator having a flat surface adjacent to and surrounding a sloping concave surface of revolution, a lens having a convex sloping surface of revolution matching and spaced above that of said concave surface, the concave surface and convex surface being complementary to each other, a plane disc positioned above said flat stator surface fastened to said lens, said lens and said disc serving as a rotor of said bearing, a first plurality of capillary tubes extending through the stator to the concave surface of revolution and supplying air to said concave surface, and a second plurality of capillary tubes extending through the stator to the flat surface thereof supplying air to said flat disc, said air acting to separate said stator and said rotor.

4. An air bearing comprising a stator having a recess therein and a flat surface totally surrounding the recess, the recess forming a surface of revolution with an axis normal to the flat surface and having a diameter decreasing with the distance from the flat surface, means to lubricate the surface of revolution including a plurality of channels terminating in the surface of revolution, a member having a surface conforming to that of the surface of revolution of the stator disposed adjacent to said surface of revolution, a disc secured to the member and confronting the flat surface of the stator, said disc being spaced from the member and having a passage extending therethrough confronting the member, and means to lubricate the confronting flat surface of the stator and disc.

5. An air bearing comprising a stator having a recess therein and a flat surface totally surrounding the recess, the recess forming a surface of revolution with an axis normal to the flat surface and having a diameter decreasing with the distance from the flat surface, means to lubricate the surface of revolution including a plurality of channels terminating in the surface of revolution, a member having a surface conforming to that of the surface of revolution of the stator disposed adjacent to said surface of revolution, a disc secured to the member and confronting the flat surface of the stator, and means to lubricate the confronting flat surfaces of the stator and disc.

References Cited in the file of this patent

UNITED STATES PATENTS

| | | |
|---|---|---|
| 1,520,356 | Lawaczeck | Dec. 23, 1924 |
| 1,980,081 | Ovington | Nov. 6, 1934 |
| 2,086,896 | Carter | July 13, 1937 |
| 2,633,392 | Luenberger | Mar. 31, 1953 |
| 2,683,636 | Wilcox | July 13, 1954 |